Patented Oct. 24, 1922.

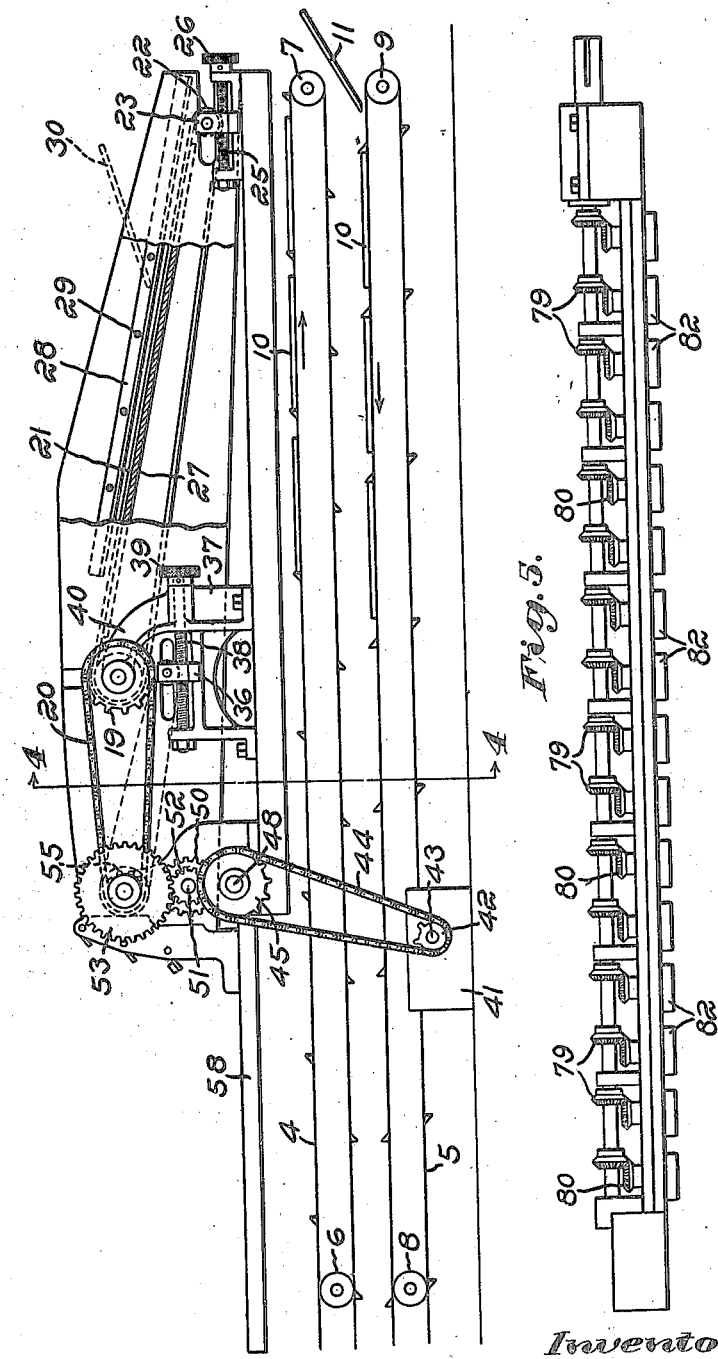

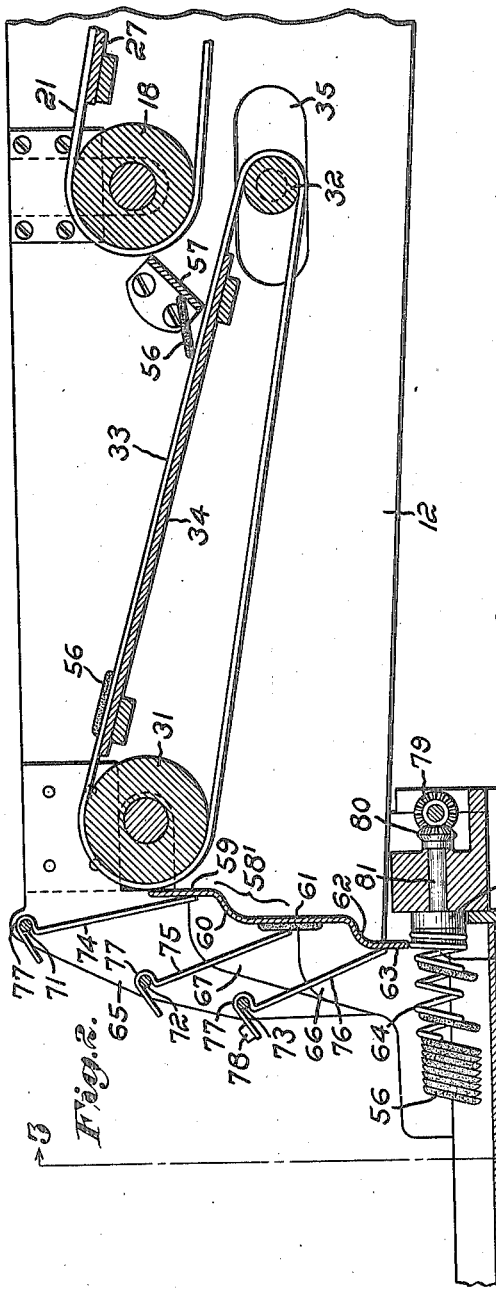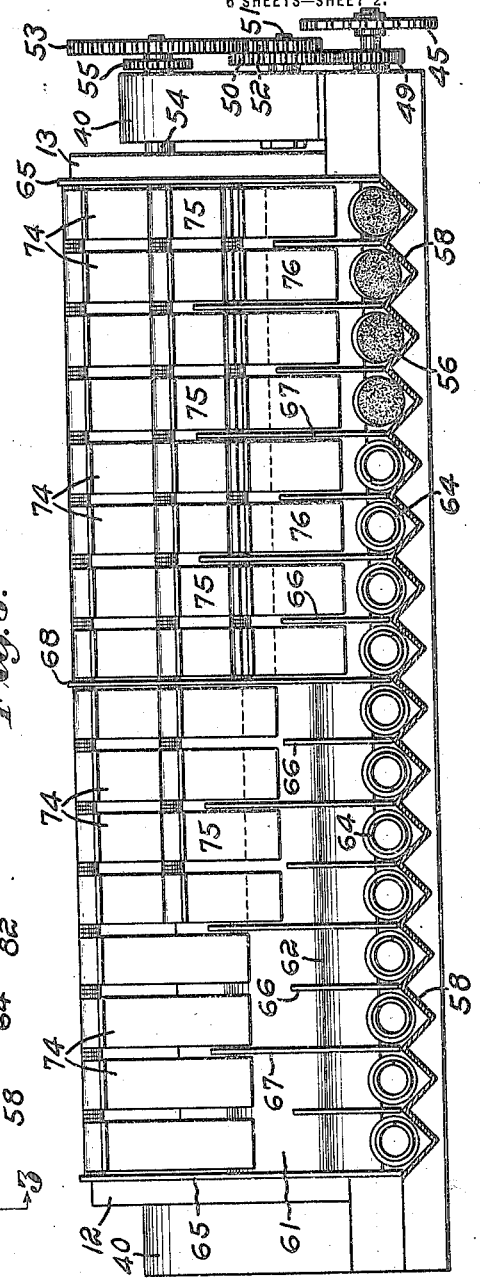

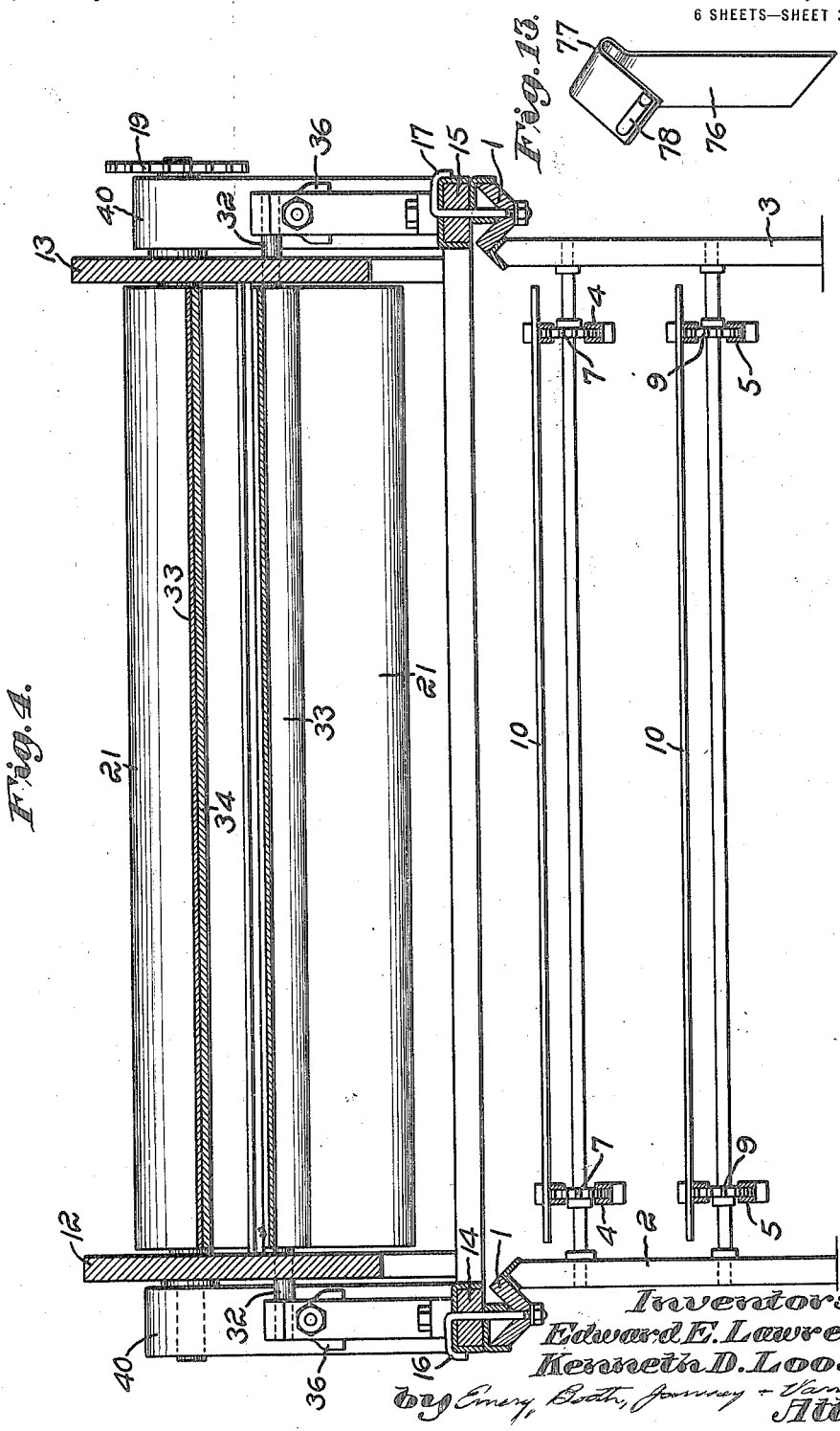

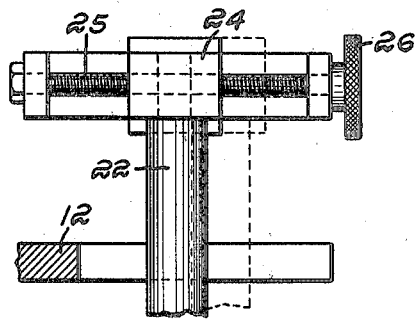
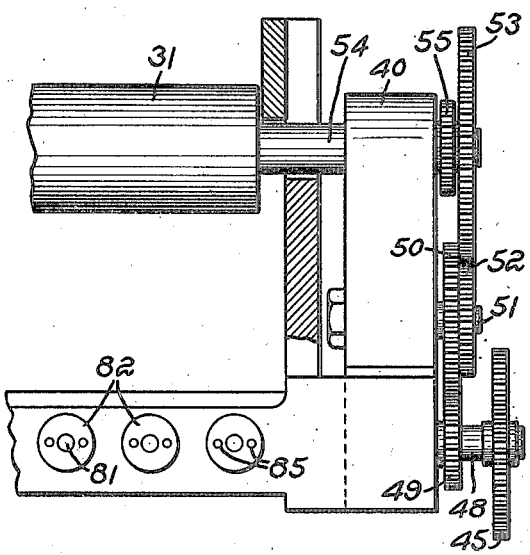
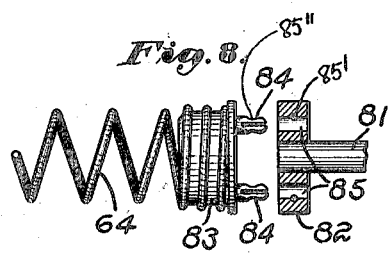
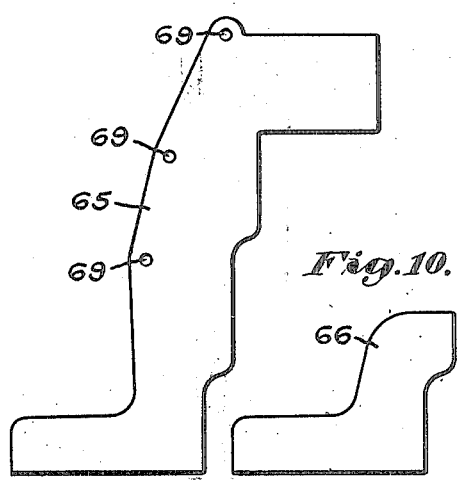
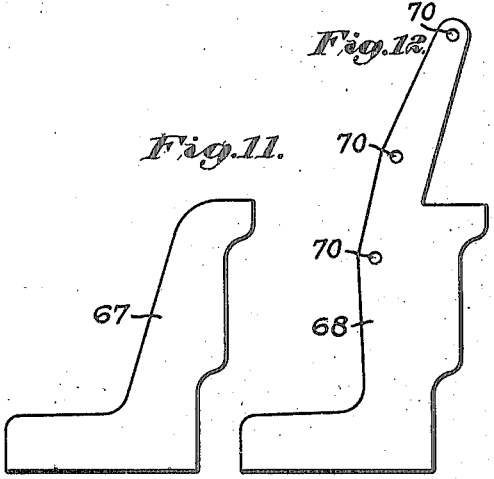

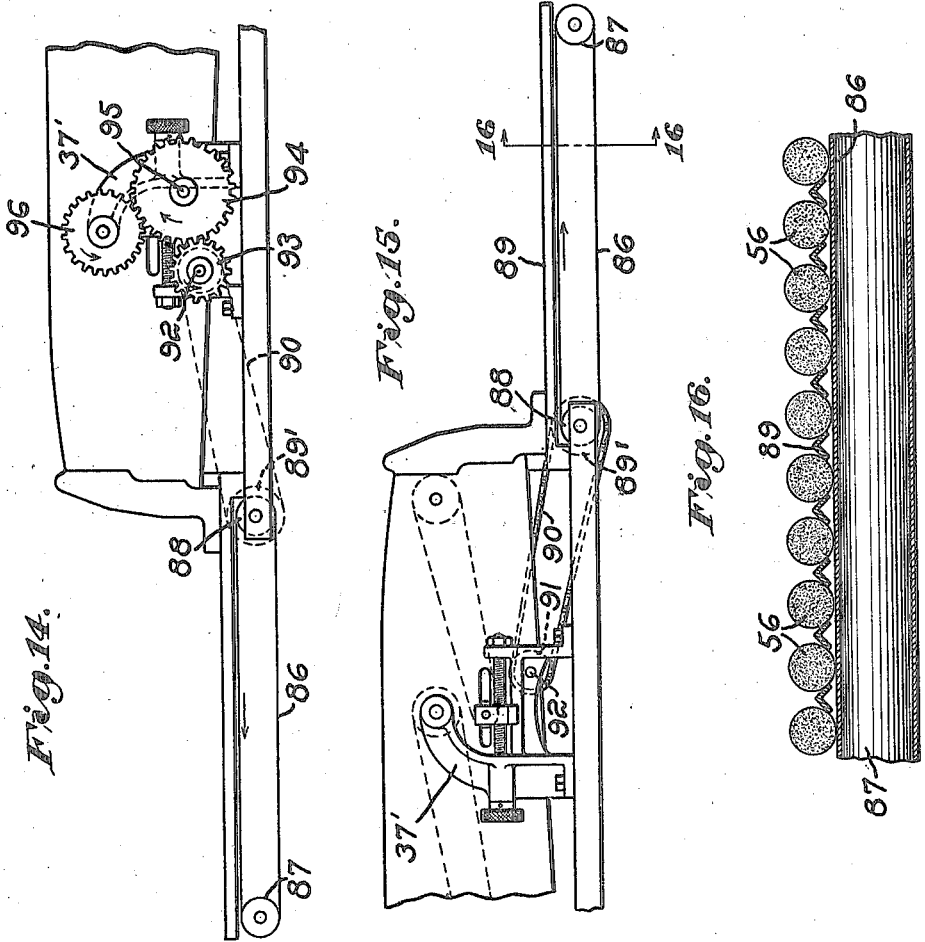

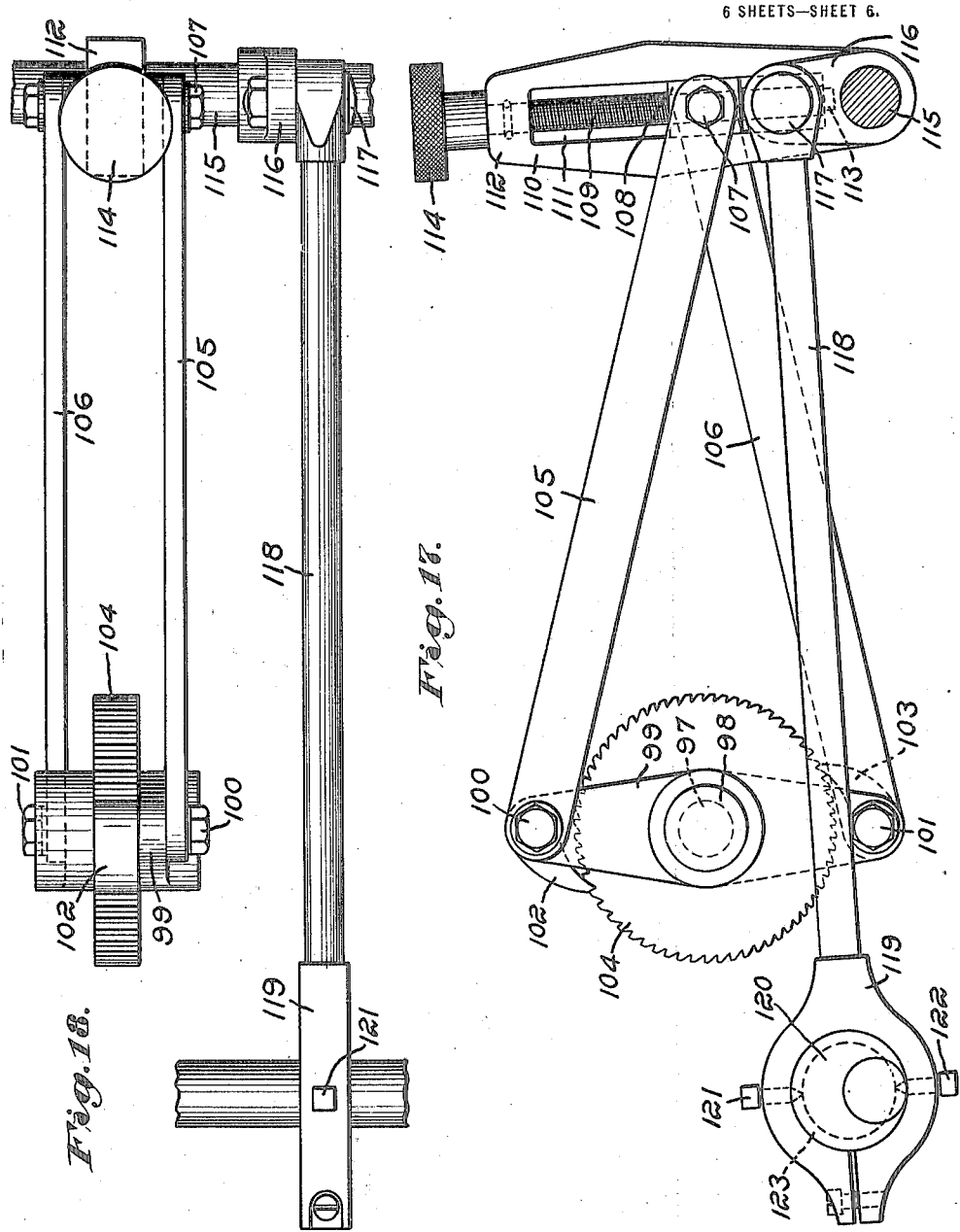

1,433,511

UNITED STATES PATENT OFFICE.

EDWARD E. LAWRENCE, OF JAMAICA, AND KENNETH D. LOOSE, OF NEW YORK, N. Y., ASSIGNORS TO LOOSE WILES BISCUIT COMPANY, OF NEW YORK, N. Y., A CORPORATION OF NEW YORK.

MECHANISM FOR CONVEYING AND STACKING FOOD PRODUCTS.

Application filed September 20, 1920. Serial No. 411,403.

*To all whom it may concern:*

Be it known that we, EDWARD E. LAWRENCE and KENNETH D. LOOSE, citizens of the United States, and residents, respectively, of Jamaica and New York, in the counties, respectively, of Queens and New York, State of New York, have invented an Improvement in Mechanism for Conveying and Stacking Food Products, of which the following description in connection with the accompanying drawings, is a specification, like characters on the drawings representing like parts.

This invention relates to mechanism for conveying and stacking articles, the disclosed example of which is food products.

In order that the principle of the invention may be readily understood, we have disclosed a single embodiment thereof in the accompanying drawings, wherein—

Fig. 1 is a side elevation but partially in vertical longitudinal section of one form of mechanism embodying the invention:

Fig. 2 is a vertical longitudinal section upon a larger scale of a portion of the structure shown in Fig. 1;

Fig. 3 is a view mainly in transverse section upon the line 3—3 of Fig. 2.

Fig. 4 is a vertical transverse section upon the line 4—4 of Fig. 1 looking toward the right in said figure;

Fig. 5 is a plan view of a portion of the mechanism for driving the stacking spirals;

Fig. 6 is a detail partially in elevation and partially in section of one part of the mechanism;

Fig. 7 is a view partly in front elevation and partly in vertical section of the means for driving one of the conveying rolls;

Fig. 8 represents in side elevation and in vertical section one of the stacking spirals;

Figs. 9 to 12 inclusive represent in side elevation partition members forming walls of the chutes;

Fig. 13 is a perspective view of one of the so-called flappers constituting the yielding front wall of the chutes;

Figs. 14 and 15 are side elevations from opposite sides of the machine showing a slightly modified form of means for receiving and feeding the articles;

Fig. 16 is a transverse section upon the line 16—16 of Fig. 15.

Fig. 17 is a side elevation of one form of means for varying the speed at which the stacked articles are caused to travel; and Fig. 18 is a plan view of the construction shown in Fig. 17.

We will disclose our invention with reference to the conveying and stacking of food products, without, however, limiting our invention thereto.

It has heretofore been proposed to arrange or stack crackers for packing, but so far as we are aware no satisfactory apparatus for this purpose has been placed upon the market, although heretofore numerous attempts have been made to provide apparatus for this purpose. The desirability of satisfactory apparatus for this purpose is manifest since crackers and like food products are now packed in small cartons or receptacles usually of the width and depth of a cracker and of a length sufficient to receive or accommodate a stack of substantial length. In satisfactorily stacking crackers or like food products, it is important that they all face the same way, that is that they be face to back and that the stacks or rows of the assembled crackers be accurately arranged and in face to back relation so that a sufficient number to constitute a stack to fill a single carton may be quickly taken by an operator or by suitable mechanism from a row in the mechanism and inserted with a minimum loss of time into the carton or receptacle.

The mechanism herein disclosed constitutes the preferred embodiment of the invention and accomplishes the desired results above indicated. Referring more particularly to the drawings, it is to be noted that the crackers or other food products may be conveyed in any suitable manner to the actual stacking or assembling part of the apparatus. Herein we have indicated one form or type of mechanism for this purpose and which in practice has been found acceptable, but the invention in its broader aspects is not limited to the employment of such type of conveying mechanism, and in another co-pending application we have set forth another type of mechanism for the purpose.

In Figs. 1 and 4 we have indicated at 1, 2, 3 a framing preferably in the nature of an elongated table like structure adapted to support certain conveyor chains indicated in part at 4, 5 as supported by or passing about rolls 6, 7, 8, 9 supported upon the framing and driven if desired in any suitable manner. At 10 we have indicated pans carried by the upper run of the belt 4 and conveying the crackers or other food products from any suitable point where the pans have been filled with crackers arranged in a plurality of transverse rows, the crackers all facing either up or down. At 11 we have indicated the empty pans or trays upon the chains 5 as being conveyed back to the place of filling.

The stacking or assembling mechanism together with the conveying means directly associated therewith is preferably mounted in a suitable framework herein indicated generally at 12, 13, 14, 15 in Fig. 4, wherein are shown the upright side walls 12, 13 wherein the mechanism is mounted and a part of the base 14, 15, which desirably is secured in any suitable manner to the framing 1, 2, 3 beneath it, as by suitable bolts 16, 17, shown in Fig. 4.

As shown most clearly in Figs. 1 and 2, a roll 18 is mounted in suitable bearings in the side frames 12, 13 and is provided with a sprocket wheel 19, driven by a sprocket chain 20 in a manner hereinafter more particularly referred to. Passing about the roll 18 is an apron 21 which as shown is inclined downward to and passes about a smaller roll 22 supported in bearings in suitable uprights 23 capable of being adjusted to provide proper tautness of the belt 21. For this purpose the bearings, one of which is indicated at 24 in Fig. 6 is adapted to be adjusted by threaded bolts 25, 26, one for each bearing.

Beneath the upper run of the belt 21 there is preferably provided a support 27 inclined to conform to the slope of the belt 21.

Desirably the crackers or the like are discharged from the pans 10 onto the upper run of the belt 21 in the following manner. As clearly indicated in Fig. 1, the sides 12, 13 extend above the upper run of said belt. Upon the inner faces of said sides and desirably close to the upper run of said belt but out of contact therewith are provided corresponding angle irons 28 secured by screws 29 or otherwise and in such manner as to afford inclined ledges parallel with the upper run of the belt and so located that an operator or two operators standing one at either side of the apparatus may support manually a filled pan 30 in substantially the position indicated in dotted lines in Fig. 1 with its lower transverse edge supported upon said ledges and hence close to and above the upper run of the belt 21. The pan so supported is given a quick jerk to the right viewing Fig. 1, with the result that the crackers supported thereon fall from the pan onto the apron all the same side up and in substantially the same relative positions that they occupy upon the pan 30.

In this or in any other suitable manner the crackers or the like are transferred to the apron 21 or endless belt and are thereby conveyed all with their faces up or down to the succeeding part of the mechanism, the disclosed embodiment of which will now be described. Mounted in suitable bearings are two rolls 31, 32 clearly indicated in Fig. 2 as receiving thereabout an endless apron or belt 33 beneath the upper run of which is a support 34. The roll 31 may be directly supported in bearings in the side frame 12, 13, but herein the roll 32 is represented as received at its ends in slots 35 permitting adjustment of the bearings, one of which is indicated at 36 and which may be similar to the bearing 24, shown in Fig. 6. In this case we have represented a take-up box 37 receiving a bolt 38 threaded throughout the greater part of its length but unthreaded where it is supported in said casting and provided with a knurled head 39 permitting rotation of the bolt and consequent adjustment of the bearing 36. Upon an integral arm 40 of said casting at each side of the apparatus, there is a suitable bearing receiving the roll 18 and fast with said roll 18 is the sprocket gear 19 driven as stated by the sprocket chain 20.

Any suitable means may be provided to drive the sprocket chain 20. Herein for the purpose and to drive the other parts of the apparatus, there is provided an electric or other motor 41 shown in Fig. 1 and having a sprocket 42 upon the shaft 43 receiving and driving a sprocket chain 44 that imparts rotative movement to the sprocket 45 indicated also in Fig. 7 and fast upon the shaft 48 mounted in suitable bearings transversely of the frame and employed for driving the stacking spirals as hereinafter referred to. Upon the shaft 48 is fast a smaller gear 49 meshing with a gear 50 upon a stud shaft 51 and having a gear 52 meshing with a gear 53 upon the roll 31 or rather upon the shaft 54 fast with said roll and carrying also a gear 55 that receives and drives the sprocket chain 20 as indicated most clearly in Fig. 1.

The crackers or other food products indicated at 56 in Fig. 2 are delivered from the apron or belt 21 onto the apron or belt 33, and if desired an intermediate slide or deflector 57 may be provided, as there shown.

While any suitable means may be employed to convey the crackers or the like to the stacking mechanism proper, I preferably employ at least two parts or members traveling at successively increased speed, so as to spread out the crackers, which may be too closely positioned upon the first traveling part or member, such as the belt 21, and sometimes are even superposed thereon. I desirably drive the second part or member, such as the belt or apron 33, at twice the speed of the belt or apron 21. It is desirable that the crackers or the like reach the discharging means, here shown as chutes, in a single depth only, though they may be handled in depths of two or three. Better results are obtained however by handling them in single depth.

The crackers 56 are conveyed by the belt or apron 33 over the roll 31 and are discharged therefrom into the stacking mechanism proper in a manner now to be disclosed.

As indicated most clearly in Fig. 3 there are preferably provided a number of channels, in the present instance sixteen, represented in cross section at 58 in Fig. 3 as of V form in cross section, desirably formed of sheet metal struck up or bent into proper shape and wherein the crackers or other food products are positioned upon edge and fed along.

In order to deposit the crackers in an edgewise condition in the several channels, we preferably provide a corresponding number of chutes, herein represented as composed of a backing member 58' which preferably extends the full width of the series of chutes or channels and has an upper vertical portion 59, a forwardly extending and preferably curved portion 60, a succeeding vertical portion 61, a succeeding forwardly extending and preferably curved portion 62 and a vertical portion 63, which as shown in Fig. 2 extends downwardly into close proximity to the series of stacking spirals indicated at 64 in the several figures and corresponding in number to the number of chutes and to the number of channels.

In order to separate the several descending series of crackers and to form the side walls of the chutes, there are provided partitions positioned edgewise to the backing 58' and which desirably are of the shape and size respectively indicated at 65, 66, 67 and 68 in Figs. 9, 10, 11 and 12. It is to be noted that in the disclosed embodiment of the invention there are provided one of the partitions 68, two of the partitions 65, six of the partitions 67 and eight of the partions 66, these being arranged as indicated in Fig. 3 wherein they are shown as alternating in height for the purpose of preventing binding, clogging or wedging of the crackers in two adjacent chutes as would likely occur if the lateral walls of adjacent chutes were of the same height. It is desirable and important, (though the invention is not restricted thereto) that the crackers or other food products be positioned substantially vertically in their descent, or in a major or substantial part thereof, rather than at an incline, so as to insure the falling thereof to one side or the other of any partition. We have ascertained through extended experimentation that if the crackers or other food products strike the top of a partition while descending at an incline, they are apt to lodge there.

Viewing Figs. 9 and 12, it will be seen that the partitions 65 and 68 are provided with holes 69, 70, wherein are received rods 71, 72 and 73 arranged transversely of the chute at successively lower levels as indicated most clearly in Fig. 2.

Preferably we provide a yielding closure for the front face of each chute, constituting a yielding resistance to the crackers at the outer faces of the several chutes so as to cause the crackers to descend edgewise and without undue velocity and in such a manner that they will be delivered edgewise to the stacking spirals, and preferably individually to each spiral.

To this end, upon the several rods 71, 72, 73 there are supported a series of so called flappers 74, 75 and 76 shown in Fig. 2 in position, one of the flappers 76 being shown in perspective in Fig. 13. These flappers are desirably of thin sheet metal and are bent as indicated at 77 into an open loop so that they may readily be hung upon the rods 71, 72, 73 as indicated in Fig. 2. The said flappers are so shaped that they normally occupy the positions shown in Fig. 2 and desirably each of the lowermost flappers 76 is provided with a small weight 78 soldered or otherwise secured thereto, so as to cause said lowermost flappers to press with somewhat more resistance against the backing 58', as at the part 63 thereof.

Viewing Fig. 2, it will be observed that a cracker or other food product 56 discharged over the roll 31 from the apron 33 falls between the uppermost flapper 74 and the upper part 59 of the backing 58' in a vertical position. The downward movement of each cracker is substantially uninterrupted and continuous, but the fall thereof is broken or eased by the several flappers 74, 75, 76 and by the bends or forwardly extending portions 60, 62, so that by the successive action of the several series of flappers the crackers are safely delivered in an edgewise vertical condition to the stacking spirals and desirably singly. The construction just described constitutes an important feature of the invention and has been found to be very effective in actual operation.

While any suitable means may be provided for receiving and feeding the crackers in an edgewise condition in and along the channels 58, we preferably employ stacking spirals 64 which for one embodiment of the invention are represented one half size in Fig. 8. The said spirals may be driven in any suitable manner and desirably for this purpose the shaft 48 is provided with a series of spaced miter gears 79 shown most clearly in Fig. 5 as meshing with like miter gears 80 upon short shafts 81, each of which at its forward end has fast thereon a disk or head 82, to which the spiral 64 is preferably detachably secured, to permit removal for any suitable purpose, as for substituting a spiral of a different size for use with a different size of cracker or other food product. To this end, each spiral 64 is here shown as coiled at its basal end about a cylindrical member 83 provided with split pins 84 adapted to be tightly but detachably received in holes or sockets 85 in the disk or head 82. In this manner each spiral is rendered readily detachable from its driving means. If desired, and as shown at 85', one or more pins may be driven into the disk or head 82 so as to pass through one or all of the holes or sockets just within the edge thereof, and past which a neck portion 85'' of the pin or pins 84 pass. The head or end of each pin 84 yields because of the split, so as to permit the renewal of the head or disk. The pins 85' may also serve to secure the disk or head to its shaft.

The channels 58 are desirably of very considerable length so that a series of operators may stand at either side of the apparatus and readily reach over and take from the various channels enough crackers 56 in stacked or face to back relation to fill a single carton, or the crackers may be removed mechanically in any suitable manner.

To this end the channels 58 are open at the top and desirably the stacking spirals 64 operate at the bottom of the chutes in an uncovered part of the structure, so that there is no liability of the crackers clogging, choking or wedging as they are fed forward. It will be observed that the lowermost parts 63 of the backing 58' delivers the crackers 56 directly to the basal spire of the stacking spirals 64 so that they are invariably delivered thereto in an edgewise condition, after passing the lowermost flappers 76.

In Figures 14, 15 and 16 we have shown a modified construction of means for receiving and feeding the crackers in edgewise position from the stacking spirals or other means receiving the crackers from the chutes.

In accordance with this form of the invention we provide a belt, apron or other suitable traveling means onto which the said spirals deliver the crackers, and provide suitable partitions extending longitudinally of the belt or other conveyor and forming therewith suitable channels.

Referring more particularly to said Figures 14, 15 and 16, the belt or apron is represented at 86 as passing about suitable rolls 87, 88 supported in the frame, the roll 88 being driven in a forward direction so as to drive the belt in the direction of the arrow as represented in Figure 14. Over the upper run of the belt are provided preferably inverted V-shaped longitudinally extending partitions 89 cooperating with the upper run of the belt 86 to constitute channels receiving the crackers 56. The belt or apron 86 may be driven in any suitable manner. For that purpose the shaft of the roll 88 is provided with a sprocket 89' indicated in Figure 15, driven by a sprocket chain 90 passing about a sprocket 91 on a suitable shaft 92, desirably mounted in bearings in the two opposite take-up boxes 37', 37'. In order to drive the shaft 92 in the proper direction any suitable means may be provided and herein we have represented a pinion 93 meshing with a suitable gear 94 upon a shaft 95 desirably mounted in said take-up boxes 37' and itself driven by a gear 96 meshing therewith and mounted upon the shaft carrying the sprocket 19, most clearly represented in Figure 1.

The proportions of the gears or other suitable driving means are desirably such as to drive the belt or apron 86 at a speed just sufficient to convey away the crackers 56 or the like from the spirals 64. Desirably the belt or apron 86 travels at a somewhat faster speed than the belt or apron 33, though our invention is not limited in this respect.

Inasmuch as it is desirable to drive the belt or apron 86 at a speed just sufficient to convey away the crackers 56 from the spirals 64, it is desirable to provide means for varying the speed of travel of said belt or apron since under varying conditions, as, for example, the thickness of the crackers or other articles, the speed of said belt or apron should be changed. Desirably also means should be provided whereby the change in the speed may be readily effected manually.

While for this purpose any suitable means may be employed, we have, in Figs. 17 and 18, represented means by which very satisfactory results have been secured. Referring to said figures, we have represented at 97 a ratchet which may be mounted upon any suitable part of the mechanism, as, for example, directly upon the shaft carrying the roll 88. Loose upon the axis 98 of said shaft is pivoted a lever 99, the opposite ends whereof are pivoted at 100, 101 to pawls 102, 103 adapted to engage the teeth 104 of the ratchet and to rotate the same substantially continuously in one direction. In order to impart a variable rocking movement to the lever 99, we preferably provide links 105, 106 pivotally connected at 100, 101 to said lever 99, and at their other ends pivotally connected at 107 to a nut 108 upon a screw 109 suitably mounted in a lever 110 having a longitudinal slot 111 receiving said screw and permitting longitudinal adjustment therealong of said nut 108. The unthreaded parts of said screw are received at 112, 113 in the lever 110, and said nut is provided with a knurled head 114 permitting ready rotation of said screw with consequent adjustment of the nut 108 along the slot 111. Obviously the throw of the links 105, 106 and their pawls 102, 103 is increased by adjusting the nut 108 outward from the pivot lever 110.

Any suitable means may be provided to rock the lever 110. For this purpose we have represented said lever as pivoted upon a stud 115 having rigid therewith a short lever arm 116 to which at 117 is pivotally connected a link 118 driven from any suitable source. For this purpose we have represented the link 118 as carrying an eccentric strap 119 receiving an eccentric 120 and held in suitable relation thereto by pointed pins 121, 122, the inner ends whereof are received in a curve 123 upon the periphery of the eccentric.

The eccentric 120 may be mounted at any desired point as stated, and if desired upon the shaft 48, most clearly represented in Fig. 1 and at either side of the mechanism. The construction is such as to impart a substantially continuous motion of rotation to the roll 88, there being at the most an exceedingly slight dwell at the end of the throw of each of the pawls 102, 103.

We have described that embodiment of our invention that is peculiarly adapted to the stacking of food products, but the invention is not limited thereto, and may be used to stack relatively thin articles which have two opposite flat or substantially flat faces. As other examples of articles that may be stacked by the invention, we may mention lozenges, paper ships, metal money and other discs.

In the claims we have employed the term disc-like, as a broad term intended to cover articles of the general shape indicated.

Having thus disclosed one illustrative embodiment of the apparatus of our invention and having described the best mode known to us for practicing our invention, we desire it to be understood that although specific terms are employed they are used in a generic and descriptive sense and not for purpose of limitation, the scope of the invention being set forth in the following claims.

Claims—

1. Mechanism for conveying and stacking disk-like articles comprising in combination, a conveyor for the non-segregated mass of articles, a downwardly directed guide for the articles having a backing, means to press the articles directly flatwise and substantially vertically against the upright part of said backing, said means adapted to be moved by the articles in passing the same, and a stacking member proper receiving the articles from said guide.

2. Mechanism for conveying and stacking disk-like articles comprising in combination, a conveyor for the non-segregated mass of articles, a downwardly directed guide for the articles to direct the articles edgewise downward, a freely movable member adapted to engage the articles when in their downward descent and by its movement to press the articles momentarily and individually against said guide and to be moved by the articles themselves to permit passage of said articles, and a stacking member proper receiving the articles from said guide, for the purpose set forth.

3. Mechanism for conveying and stacking disk-like articles comprising in combination, a conveyor for the non-segregated mass of articles, a guide down which the articles are adapted to pass substantially vertically and edgewise, a freely movable member adapted to engage the surface of the articles while in their substantially vertical edgewise descent, and to position the same momentarily against said guide in edgewise vertical position and to be moved by the articles themselves to permit passage of said articles, and a stacking member proper receiving the articles from said guide, for the purpose set forth.

4. Mechanism for conveying and stacking disk-like articles comprising in combination, a conveyor for the non-segregated mass of articles, a downwardly directed guide for the vertical edgewise descent of the articles, a movable flapper adapted to engage the face of the articles in their downward edgewise descent and press the same directly against the guide in substantially vertical position and adapted to be moved by the articles, and a stacking member proper receiving the articles from said guide.

5. Mechanism for conveying and stacking disc-like articles comprising in combination, a conveyor for the non-segregated mass of articles, a series of chutes each having one or more pivoted flappers to cooperate with a wall of the chute in holding the articles individually edgewise against said wall of the chute and to be moved by said articles, and means to feed the articles in stacks away from the lower ends of said chutes.

6. Mechanism for conveying and stacking disc-like articles comprising in combination, a conveyor for the non-segregated mass of articles, a series of chutes, downwardly extending flappers pivoted transversely of the chutes to constitute the front walls thereof, and adapted to press each article individually against a wall of said chute and to be moved by said articles, and means to feed the articles edgewise from the lower ends of the chutes.

7. Mechanism for conveying and stacking disc-like articles comprising in combination, a conveyor for the non-segregated mass of articles, a series of downwardly extending substantially upright chutes, flappers mounted on pivots that are transverse to the longitudinal axis of the chutes and adapted to press the articles flatwise against the back of said chutes and to be moved by said articles, and means to feed the articles from the lower ends of the chutes.

8. Mechanism for conveying and stacking disk-like articles comprising in combination, a conveyor for the non-segregated mass of articles, a downwardly directed substantially upright guide for the substantially vertical, downward, edgewise descent of the articles, one or more movable flappers adapted to engage a face of said articles while in such downward descent and to press the articles against a wall of said guide and to be moved by said articles, and a stacking member proper receiving the articles from said guide.

9. Mechanism for conveying and stacking disc-like articles comprising in combination, a conveyor for the non-segregated mass of articles, a series of downwardly directed chutes and freely movable members to engage faces of the articles as they descend the chutes and acting to press the same one after another against the back of said chute to cause said articles to descend the chutes edgewise and adapted because of their freely movable character to be moved by the articles themselves to permit passage of said articles.

10. Mechanism for conveying and stacking disk-like articles comprising in combination, a conveyor for the non-segregated mass of articles, a downwardly directed guide for the articles having a backing, flapper-like members adapted by gravity to press the articles directly flatwise and substantially vertically against the said backing, and a stacking member proper receiving the articles from said guide.

11. Mechanism for conveying and stacking disk-like articles comprising in combination, a conveyor for the non-segregated mass of articles, a downwardly directed guide for the articles having a stepped backing, means to press the articles directly flatwise and substantially vertically against the upright parts of said backing, and a stacking member proper receiving the articles from said guide.

12. Mechanism for conveying and stacking disk-like articles comprising in combination, a conveyor for the non-segregated mass of articles, a downwardly directed guide for the articles along which they are adapted to pass edgewise and substantially vertically, flapper-like members freely mounted to check by their weight said edgewise, substantially vertical descent, and a stacking member proper receiving the articles from said guide.

13. Mechanism for conveying and stacking disk-like articles comprising in combination, a conveyor for the non-segregated mass of articles, a substantially vertically downwardly directed guide for the articles, pivoted flappers adapted to rock by gravity upon their pivots and to engage the articles during their descent, and thereby press them flatwise against said guide, and a stacking member proper receiving the articles from said guide.

14. Mechanism for conveying and stacking disc-like articles comprising in combination, a conveyor for the non-segregated mass of articles, and a substantially vertically downwardly extending chute having a yielding wall adapted to be moved in one direction by gravity to press the articles substantially vertically against the chute and in the opposite direction by the articles, composed of a series of movable parts.

15. Mechanism for conveying and stacking disc-like articles comprising in combination, a conveyor for the non-segregated mass of articles, a substantially vertically a downwardly extending chute having a yielding wall composed of a series of freely movable parts adapted because of their freely movable character to press the articles substantially upright against the chute, and means to move the articles edgewise away from the lower end of the chutes in a direction transverse to the axis of said chutes.

16. Mechanism for conveying and stacking disc-like articles comprising in combination, a conveyor for the non-segregated mass of articles, and a series of chutes each having a wall composed of a series of flappers freely mounted one above another to engage the faces of the articles and adapted because of their freely mounted character to be moved by the articles themselves to permit the passage of said articles.

17. Mechanism for conveying and stacking disc-like articles comprising in combination, a conveyor for the non-segregated mass of articles, and a chute having a backing composed of upright parts, one or more intermediate, forwardly inclined parts, and a front face cooperating with the backing to position the articles flatwise against the backing.

18. Mechanism for conveying and stacking disc-like articles comprising in combination, a conveyor for the non-segregated mass of articles, and a chute having a backing composed of upright parts, forwardly inclined, intermediate parts and cooperating flappers mounted transversely of said chutes.

19. Mechanism for conveying and stacking disc-like articles comprising in combination, a conveyor for the non-segregated mass of articles, a chute having a forwardly stepped backing, and a flapper to engage articles against the upright part of each step so as to break the fall or descent of the articles.

20. Mechanism for conveying and stacking disc-like articles comprising in combination, a conveyor for the non-segregated mass of articles, a chute having a cross piece and a series of flappers to cooperate with the articles descending said chute and so bent at one end to form a loop by which it may be hung upon said cross piece with capacity for ready removal.

21. Mechanism for conveying and stacking disc-like articles comprising in combination, a conveyor for the non-segregated mass of articles, a chute, and a series of flappers at one face of the chute positioned at successively lower points and mounted for movement by gravity and by the weight of the articles, the lowermost flapper being weighted to oppose more resistance to the descent or fall of the articles.

22. Mechanism for conveying and stacking disc-like articles comprising in combination, a conveyor for the non-segregated mass of articles, a chute, and a series of flappers one above another, and cooperating with the chute in causing the articles to descend the chute edgewise and mounted for movement by gravity and by the weight of the articles, the lower one of said flappers presenting greater resistance to the descent of the articles.

23. Mechanism for conveying and stacking disc-like articles comprising in combination, a conveyor for the non-segregated mass of articles, and a series of chutes composed of a rear wall and partitions which are alternately of greater and lesser height to prevent wedging, clogging or binding of the articles in their descent.

24. Mechanism for conveying and stacking disc-like articles comprising in combination, a conveyor for the non-segregated mass of articles, and a chute composed of a backing and a series of transversely arranged partitions of varying height, and yielding members between said partitions and constituting a yielding front face for said chute.

25. Mechanism for conveying and stacking disc-like articles comprising in combination, a conveyor for the non-segregated mass of articles, a substantially vertically upright chute for the articles, means acting under the influence of gravity and yielding to the weight of said articles to maintain the articles upright in said chute by yieldingly pressing them against an upright wall of said chute, means to receive the articles edgewise from the bottom of the chute and to feed the same in stacked relation, a conveyor to deliver filled pans or trays into position to have their contents discharged onto the first mentioned conveyor, and a return conveyor for the empty pans or trays.

26. Mechanism for conveying and stacking disk-like articles comprising in combination, a conveyor for the non-segregated mass of articles, a substantially vertically downwardly directed guide for the articles, flappers acting under the influence of gravity to engage the articles while passing substantially vertically downward edgewise along said guide and to press them in such condition against a wall of said guide, and a stacking member proper receiving the articles from said guide.

27. In a mechanism for conveying and stacking disc-like articles, a series of stacking spirals, each having a basal portion receiving the base of the spiral, and one or more protruding pins, and a driven shaft having a head or disk provided with one or more holes to receive said pins.

28. Mechanism for conveying and stacking disk-like articles comprising in combination, a conveyor for the non-segregated mass of articles, a downwardly directed guide for the articles having a stepped backing, a series of flappers one above the other and adapted to engage the face of the articles and to press the same against said backing, and a stacking member proper receiving the articles from said guide.

29. Mechanism for conveying and stacking disc-like articles comprising in combination, an upwardly traveling belt or conveyor having immediately ensuing, substantially vertical descent, a substantially vertically downwardly directed guide at said point of substantially vertical descent, a plurality of flapper-like gravity actuated members yieldable to the weight of said articles successively to engage said articles passing down said guide and to press them against a wall of said guide while descending vertically edgewise, and a stacking member proper receiving the articles from said guide.

30. In a mechanism for conveying and stacking disk-like articles, a stacking spiral, a basal portion encircled by the spiral, rotating means for the spiral, and means detachably to secure said basal portion to said rotating means.

31. Mechanism for conveying and stacking disc-like articles comprising in combination, a conveyor for the non-segregated mass of articles, a substantially vertically downwardly directed guide for the articles having a series of forwardly directed upright partitions between which the articles are received, and means movable by said articles and by gravity to present each of the articles edgewise and vertically against a wall of said guide thereby preventing clogging or wedging of the articles at the top of said partitions.

32. Mechanism for conveying and stacking disc-like articles comprising in combination, a conveyor for the non-segregated mass of articles, and a series of chutes composed of a backing, forwardly extending transverse partitions of less height than said backing, and one or more movable members between adjacent partitions, the parts being constructed and arranged to present the articles vertically downward, edgewise, to and between said partitions, whereby the articles drop between the partitions without clogging.

33. Mechanism for conveying and stacking disc-like articles comprising in combination, a conveyor for the non-segregated mass of articles, and a series of chutes composed of a backing, forwardly extending transverse partitions of less height than said backing, and one or more movable members between adjacent partitions, the parts being constructed and arranged to present the articles vertically downward, edgewise, to and between said partitions whereby the articles drop between the partitions without clogging, and a series of conveyors at the base of the chute to which the articles are presented edgewise, to be fed in stacks in such position.

34. In a mechanism for conveying and stacking disk-like articles, a stacking spiral, a basal portion to which the spiral is attached, rotating means for the spiral, and means detachably to secure said basal portion to said securing means.

35. Mechanism for conveying and stacking disk-like articles comprising in combination, a conveyor for the non-segregated mass of articles, and a series of chutes composed of a backing, upwardly extending, transverse partitions of less height than said backing, and one or more movable members between adjacent partitions and adapted to engage a face of the articles during their downward edgewise descent, the parts being constructed and arranged to present the articles vertically downward edgewise to and between said partitions, whereby the articles drop between the partitions without clogging.

36. Mechanism for conveying and stacking disk-like articles comprising in combination, a conveyor for the non-segregated mass of articles, and a series of chutes composed of a backing, forwardly extending, transverse partitions of less height than said backing, and one or more pivoted flappers between adjacent partitions and adapted yieldingly to engage the exposed face of the articles in their descent, the parts being constructed and arranged to present the articles vertically downward edgewise to and between said partitions, whereby the articles drop between the partitions without clogging.

37. In a mechanism for conveying and stacking disc-like articles, in combination, a conveyor for the mass of articles including means to spread out the articles, a substantially vertically downwardly directed chute for the articles, means to deliver the articles edgewise down the chute including a plurality of swingable members normally extending into the path of the edgewise descending articles and yieldable to the weight of the same whereby said articles are momentarily yieldingly held against an upright wall of said chute during their descent and a stacking device proper including a member directly receiving the articles at the bottom of the chute, a forwardly traveling belt receiving the articles from said member and a plurality of forwardly extending fixed partitions above said belt and providing a channel or channels for the articles in upstanding edgewise position.

38. Mechanism for conveying and stacking disk-like articles comprising in combination, a conveyor for the non-segregated mass of articles, a downwardly directed guide for the articles to direct the same edgewise downwardly, and a flapper co-acting with a wall of said guide to position the articles individually and vertically against said wall, said flapper being movable by said articles to pass the same in vertical position.

39. Mechanism for conveying and stacking disk-like articles comprising in combination, a conveyor for the non-segregated mass of articles, a downwardly directed guide for the articles to direct the same edgewise downwardly, and a flapper movable under the influence of gravity in one direction and under the weight of the articles in the opposite direction, and adapted to press said articles individually and vertically against a wall of said guide.

In testimony whereof, we have signed our names to this specification.

EDWARD E. LAWRENCE,
KENNETH D. LOOSE.

Certificate of Correction.

It is hereby certified that in Letters Patent No. 1,433,511, granted October 24, 1922, upon the application of Edward E. Lawrence, of Jamaica, and Kenneth D. Loose, of New York, N. Y., for an improvement in "Mechanism for Conveying and Stacking Food Products," errors appear in the printed specification requiring correction as follows: Page 6, line 88, claim 14, strike out the words "composed of a series of movable parts" and insert the same to follow the word "wall", line 84, and line 87, after the word "articles" strike out the comma; same page, line 92, claim 15, strike out the article "a", second occurrence, and line 106, claim 16, strike out the words "freely mounted," and insert the same before the word "flappers" in line 105; and that the said Letters Patent should be read with these corrections therein that the same may conform to the record of the case in the Patent Office.

Signed and sealed this 28th day of November, A. D., 1922.

[SEAL.]

KARL FENNING,
*Acting Commissioner of Patents.*